(12) United States Patent
Furuki et al.

(10) Patent No.: US 6,803,904 B2
(45) Date of Patent: Oct. 12, 2004

(54) KEYBOARD INPUT DEVICE TO BE RELIABLY CONNECTED TO PORTABLE DEVICE

(75) Inventors: Shigeru Furuki, Fukushima-ken (JP); Kazutoshi Watanabe, Fukushima-ken (JP); Takahiro Kawauchi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 202 days.

(21) Appl. No.: 10/001,566

(22) Filed: Nov. 1, 2001

(65) Prior Publication Data

US 2002/0050980 A1 May 2, 2002

(30) Foreign Application Priority Data

Nov. 2, 2000 (JP) .......................................... 2000-335940

(51) Int. Cl.⁷ ................................................. G09G 5/00
(52) U.S. Cl. ......................... 345/168; 345/156; 361/680
(58) Field of Search ................................ 439/296, 299, 439/31, 49, 286, 372; 345/168, 169, 170, 171, 172; 341/22; 361/680, 681, 682; 400/82, 88, 489, 682, 691, 692, 693

(56) References Cited

U.S. PATENT DOCUMENTS

| | | | | |
|---|---|---|---|---|
| 4,152,038 A | * | 5/1979 | Inouye et al. | 439/153 |
| 4,341,428 A | * | 7/1982 | Hatch et al. | 439/372 |
| 5,253,139 A | * | 10/1993 | Satou | 361/681 |
| 5,267,127 A | * | 11/1993 | Pollitt | 361/680 |
| 5,457,453 A | * | 10/1995 | Chiu et al. | 341/22 |
| 5,995,025 A | * | 11/1999 | Sternglass et al. | 341/22 |
| 6,108,200 A | * | 8/2000 | Fullerton | 361/686 |
| 6,147,858 A | * | 11/2000 | Takahashi | 361/680 |
| 6,189,056 B1 | * | 2/2001 | Ogura et al. | 710/62 |
| 6,256,017 B1 | * | 7/2001 | Bullister | 345/168 |
| 6,262,785 B1 | * | 7/2001 | Kim | 349/58 |
| 6,266,234 B1 | * | 7/2001 | Leman | 361/680 |
| 6,325,634 B1 | * | 12/2001 | Daoud et al. | 439/49 |
| 6,614,649 B1 | * | 9/2003 | Wang | 361/680 |
| 6,734,809 B1 | * | 5/2004 | Olodort et al. | 341/22 |

FOREIGN PATENT DOCUMENTS

| | | | | |
|---|---|---|---|---|
| EP | 1225501 A2 | * | 7/2002 | G06F/1/16 |
| JP | 09084265 A | * | 3/1997 | H02J/1/00 |
| JP | 10032046 A | * | 2/1998 | H01R/13/64 |

OTHER PUBLICATIONS

Connectors Drive Advances for SCSI, Electronic Engineering Times, Apr. 24, 1995, at 95.*
Greame, W. H., Module with Multilength Pins, 24 IBM Tech. Disclosure Bull. 11 (Jun. 1981).*

* cited by examiner

Primary Examiner—Amare Mengistu
Assistant Examiner—Nitin Patel
(74) Attorney, Agent, or Firm—Brinks Hofer Gilson & Lione

(57) ABSTRACT

In a keyboard input device, including a keyboard body and a device mounting member for mounting thereon a portable device. The device mounting member is pivotally supported by the keyboard body. A connector for connecting the keyboard body and the portable device is disposed on the pivotable portion of the mounting member.

9 Claims, 27 Drawing Sheets

KEYBOARD INPUT DEVICE TO BE RELIABLY CONNECTED TO PORTABLE DEVICE

BACKGROUND OF THE INVENTION

1. Field of the Invention

The present invention relates to a keyboard input device for use in, for example, a portable personal computer, and more particularly, to a keyboard input device which can used in connection with a portable device such as a portable telephone.

2. Description of the Related Art

In recent years, portable personal computers and the like have sometimes been used with a keyboard input device connected to a portable telephone or the like. In such cases, the keyboard input device and the portable telephone are operated in a state in which a part of the portable telephone is located laterally of the keyboard input device and a part of the portable telephone is inserted in a connector disposed on a side face of the keyboard input device.

In the conventional keyboard input device having the above configuration, the portable telephone is partly inserted into the keyboard input device, but is not entirely supported thereby. Therefore, the portable telephone is held unstably, and stress is applied to the connector, thus making the connector prone to damage. This decreases the reliability of the connection between the keyboard input device and the portable telephone.

Furthermore, since the portable telephone is inserted in the keyboard input device from the side, it is difficult for the operator to view the display and operating portions of the portable telephone and to operate the operating portions. Moreover, when operating portions of the portable telephone, stress is applied to the connector, which can further damage the connector.

SUMMARY OF THE INVENTION

The purpose of the present invention is to overcome the above problems in the conventional art. It is an object of the present invention to provide a keyboard input device which can stably support a portable device, such as a portable telephone, when inserted therein. A further object of this invention is to establish a firm and reliable connection with the portable device, which allows the portable device to be easily viewed and operated.

In order to achieve the above objects, according to an aspect of the present invention, there is provided a keyboard input device having a device mounting member, such as a cover member which will be described later, for mounting thereon a portable device, such as a portable telephone. The device mounting member is pivotally supported by the keyboard body, and a connector for connecting the keyboard body and the portable device is disposed on the pivot side of the device mounting member.

As a result of this invention and since the device mounting member is disposed in the keyboard body, the portable device can be stably held and can be easily operated. Since the connector for connecting the keyboard body and the portable device is disposed on the pivot-side at the base end of the device mounting member, the portable device can be held reliably. Furthermore, since the portable device is supported by the device mounting member, and extra force is not applied to the connector, the connector will not be damaged even when the portable device is repeatedly attached and detached. This makes it possible to maintain the functions of the connector for a much longer period, and to improve reliability.

Preferably, the portable device can be placed in a tilted position. This allows a display portion and an operating portion of the portable device to be easily viewed and operated.

Preferably, the tilting angle of the portable device is arbitrarily adjustable. This allows the display portion and the operating portion of the portable device to be easily viewed and operated.

Preferably, the device mounting member is in the form of a plate. As a result, when the device mounting member is folded toward the keyboard body, the increase in thickness of the keyboard input device is insignificant.

Preferably, the device mounting member has a holding recess for holding the portable device. This makes it possible to hold the portable device on the device mounting member more reliably.

Preferably, the device mounting member also functions as a cover member for covering at least a part of the keyboard body. This eliminates the necessity of using an additional component.

Preferably, the keyboard input body is divided so that it can be folded, and the device mounting member is supported by the keyboard input device so that it can be folded. This reduces the size of the keyboard input device.

Preferably, the connector is pivotally supported. In this case, even though the position of a connector portion built in the portable device may vary among models or among manufacturers, it is possible to accomodate such variations and to consistently establish a reliable connection with the portable device.

According to another aspect of the present invention, there is provided a keyboard input device having a keyboard body with a connector for establishing connection with an external device, such as a portable telephone, wherein the connector is movably connected so that it can vertically move or can pivot, and has a retaining portion, such as a retaining claw, to be engaged with a part of the external device, and the engagement (locking) and disengagement (unlocking) of the retaining portion with and from the external device are switched by the movement of the connector.

In this case, the external device can be more easily attached and detached than in a case in which the external device is attached and detached by pressing an eject button.

According to a further aspect of the present invention, there is provided a keyboard input device wherein a keyboard body is divided so that it can be folded, and a display portion, such as a liquid crystal panel, is supported by the keyboard body so that it can be folded onto the folded keyboard body.

This makes it possible to provide a smaller keyboard input device with a display portion, and the display screen is protected by the folding structure.

According to a further aspect of the present invention, there is provided a keyboard input device wherein a keyboard body has a connector for establishing connection with a connector portion of an external device, each of the connector of the keyboard body and the connector portion of the external device has two ground pins and a predetermined number of data pins. In accordance with this invention the two ground pins of the connector and the two ground pins of the connector portion are connected to each other so as to power the keyboard body on, and at least one of the ground pins of the connector is shorter than the other pins.

In this case, even when the connector portion of the external device is obliquely inserted into the connector of the keyboard body, data input and output are always possible while the keyboard body is powered on.

Further objects, features, and advantages of the present invention will become apparent from the following description of the preferred embodiments with reference to the attached drawings.

DESCRIPTION OF THE PREFERRED EMBODIMENTS

Preferred embodiments of the present invention will be described below with reference to the attached drawings.

Figure 1:
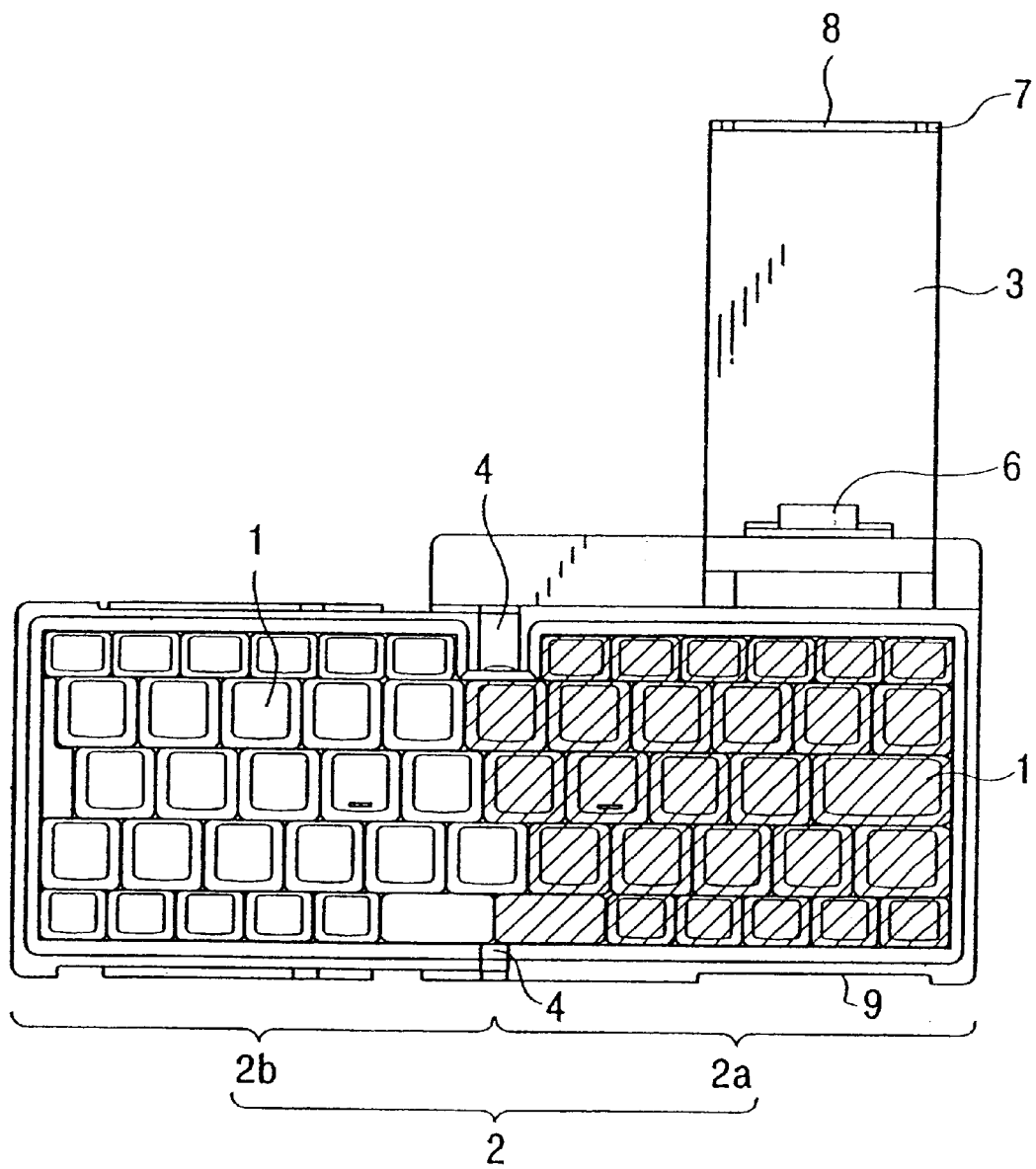
FIG. 1 is a plan view of a keyboard input device according to a first embodiment of the present invention.
Figure 2:
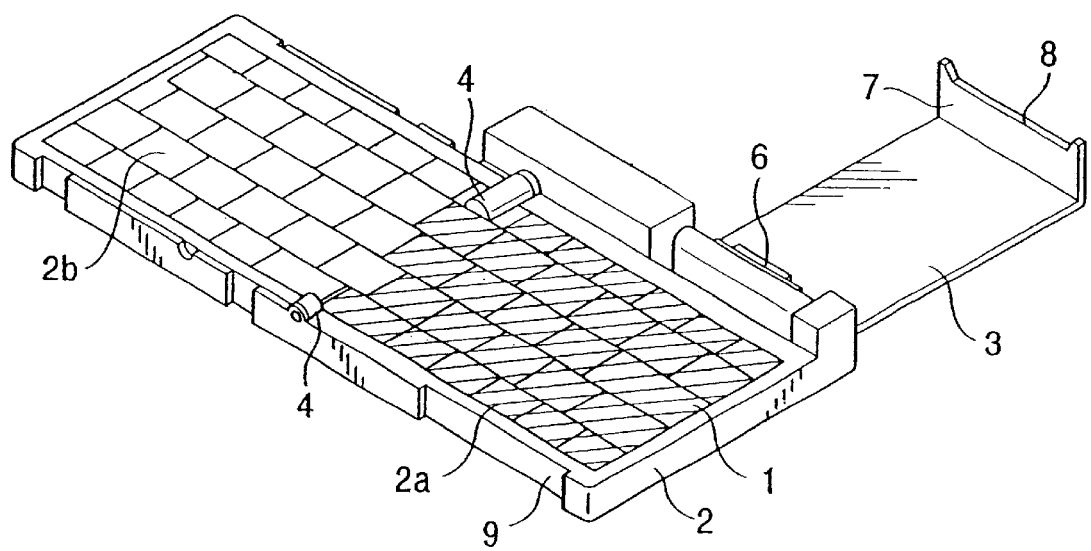
FIG. 2 is a perspective view of the keyboard input device.
Figure 3:
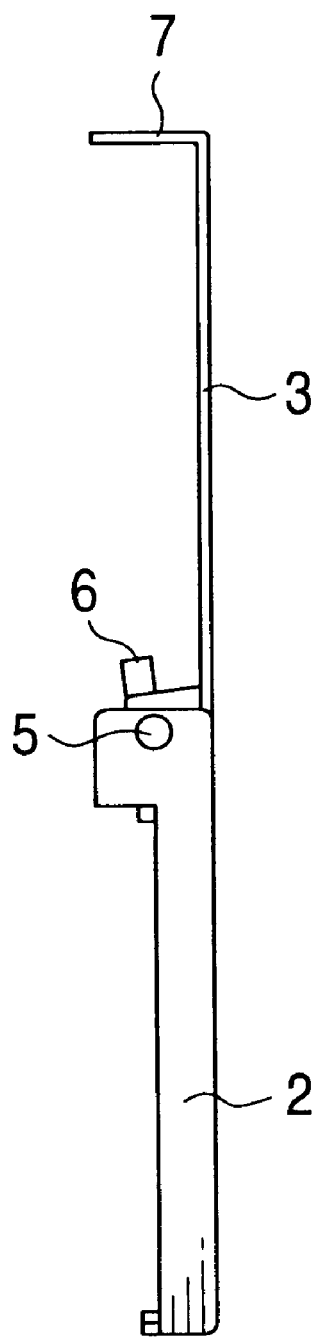
FIG. 3 is a side view of the keyboard input device.
Figure 4:
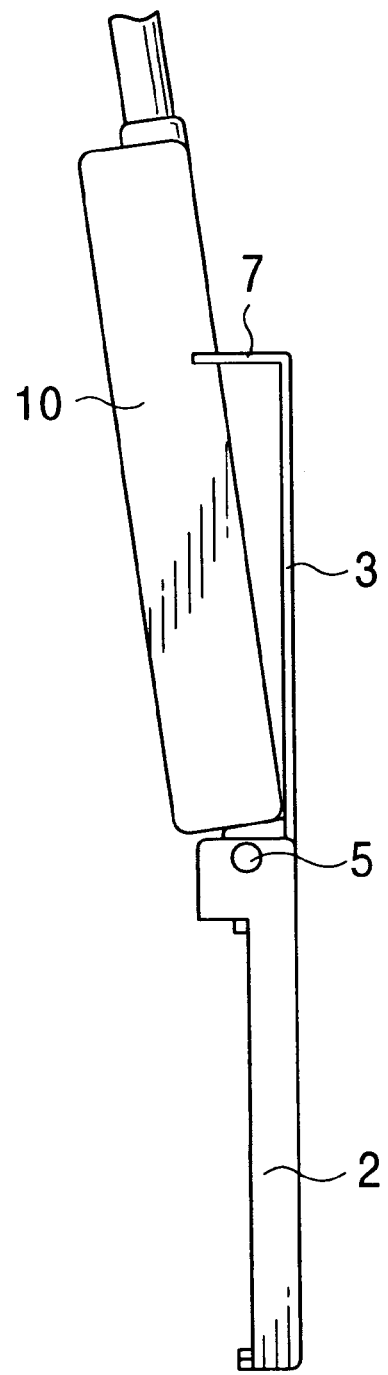
FIG. 4 is a side view of the keyboard input device to which a portable telephone is attached.
Figure 5:
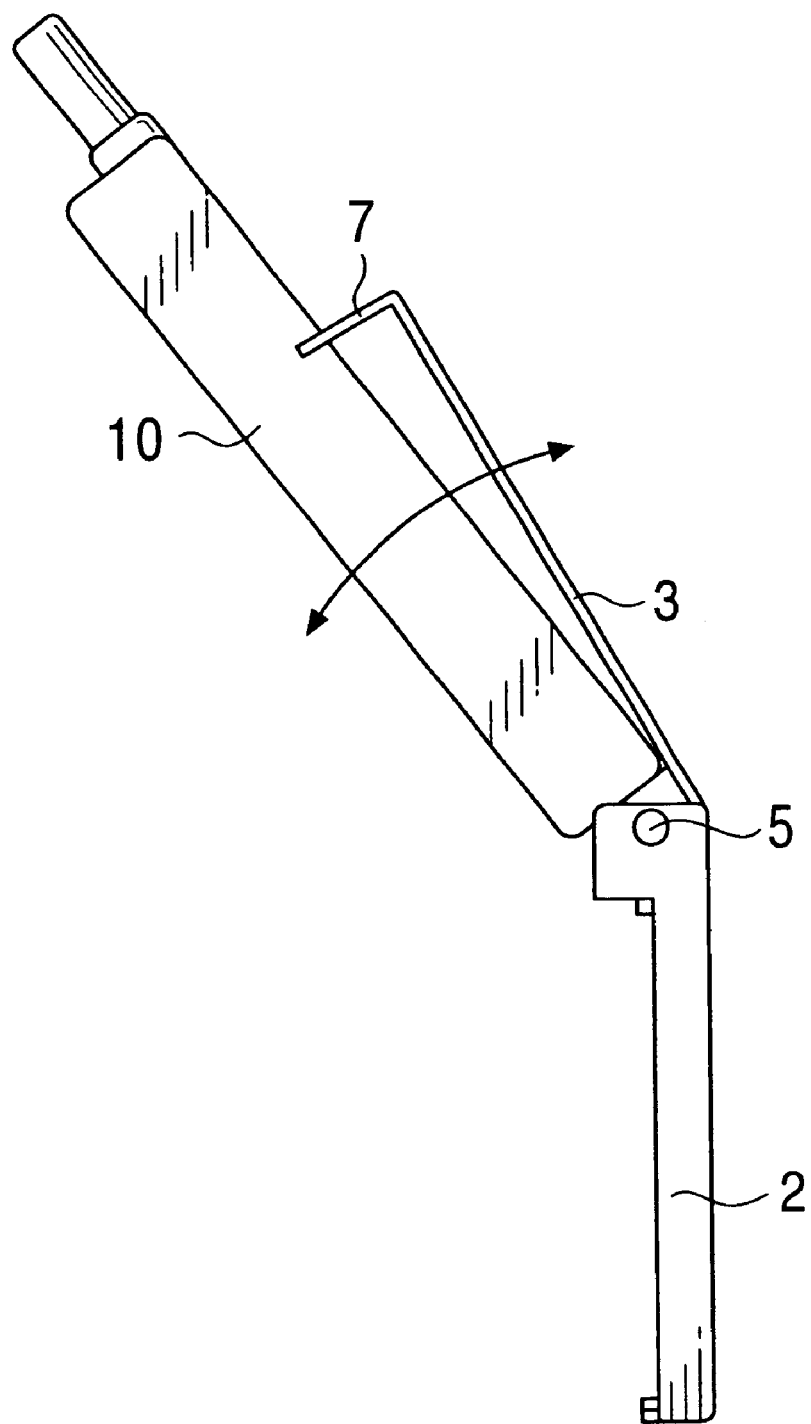
FIG. 5 is a side view of the keyboard input device to which the portable telephone is attached.
Figure 6:
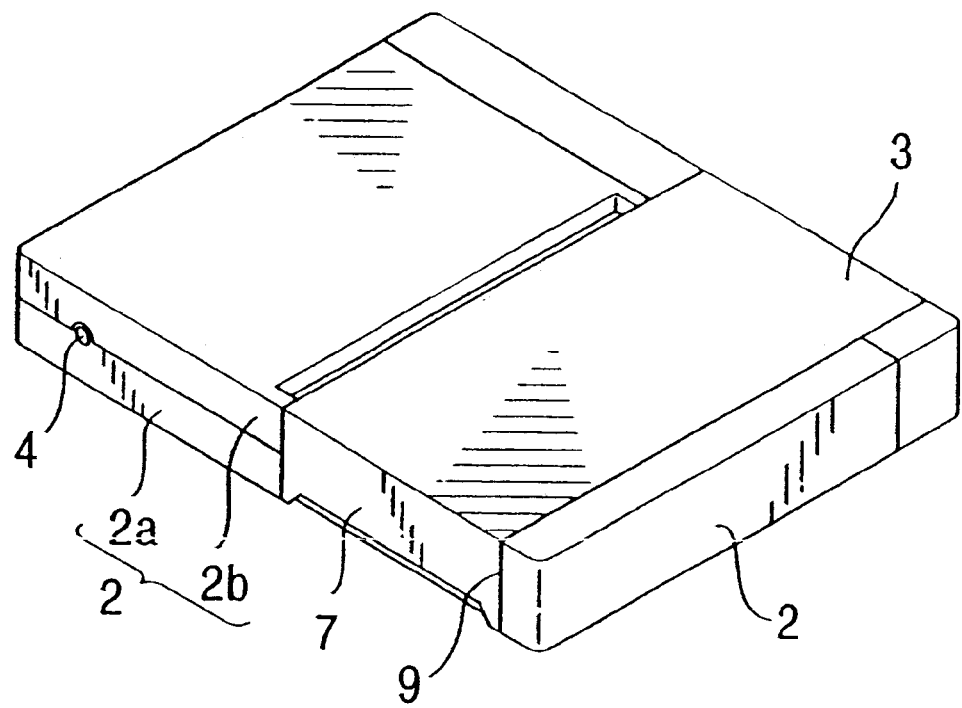
FIG. 6 is a perspective view of the keyboard input device in a non-operation state.

FIGS. 1 to 6 show a first embodiment of the present invention. FIG. 1 is a plan view of a keyboard input device of the first embodiment, FIG. 2 is a perspective view of the keyboard input device, FIG. 3 is a side view of the keyboard input device, FIGS. 4 and 5 are side views of the keyboard input device to which a portable telephone is attached, and FIG. 6 is a perspective view of the keyboard input device in a folded state.

A keyboard input device of the first embodiment is connected to an information processing apparatus (not shown), such as a portable personal computer, and comprises a keyboard body 2 having multiple input keys 1, and a cover member 3 for covering the upper surface of the keyboard body 2. The keyboard body 2 is divided into a first keyboard unit 2a and a second keyboard unit 2b. The first and second keyboard units 2a and 2b have almost the same area, and are connected by unit hinges 4 so that the keyboard body 2 can be folded. In FIGS. 1 and 2, the first keyboard unit 2a includes input keys 1 arranged in a diagonally shaded area, and the second keyboard unit 2b includes input keys 1 arranged in an unshaded area.

The cover member 3 is shaped like a plate made of, for example, synthetic resin or metal, and is connected, by a cover hinge 5 (see FIGS. 3 to 5), to the side of the first keyboard unit 2a opposite from an operator. While the cover hinge 5 is shown in FIGS. 3 to 5 for explanation, it is, in reality, not exposed from the side face of the keyboard body 2 for the purpose of design, as shown in FIGS. 2 and 6.

A multipin connector 6 is placed on the pivot side, serving as the base end, of the cover member 3, that is, on the side of the cover hinge 5. A nearly L-shaped supporting projection 7 for supporting a portable telephone 10 in a tilted position is formed at the free end of the cover member 3. A shallow holding recess 8 is formed at the top center of the supporting projection 7, as shown in FIG. 2. Although not shown, an angle adjusting mechanism is incorporated in a connecting portion between the keyboard body 2 and the cover member 3 so as to moderately adjust the tilting angle of the cover member 3 and so as to place the portable telephone 10 in an arbitrary tilted position.

In order for the portable telephone 10 to be easily inserted, the connector 6 is slightly inclined toward the leading end of the supporting projection 7 (toward the holding recess 8), as shown in FIG. 3. A supporting projection accommodating recess 9 for accommodating the supporting projection 7 of the cover member 3 is formed on the front end face of the keyboard body 2, as shown in FIGS. 1 and 2.

As shown in FIGS. 4 and 5, the portable telephone 10 is placed on the cover member 3 in a longitudinal orientation, a connector portion (not shown) formed at the bottom of the portable telephone 10 is inserted into the connector 6, and the leading end of the portable telephone 10 is placed into the holding recess 8 of the supporting projection 7. Consequently, the portable telephone 10 is connected to the portable personal computer (not shown) via the keyboard input device, and data communication using the portable telephone 10 is made possible.

Since the portable telephone 10 is held in a longitudinal orientation on the cover member 3 while it is slightly raised on the leading side, the display and operating portions thereof can be easily viewed and can be easily operated. The tilting angle of the portable telephone 10 can be arbitrarily adjusted by the above-described angle adjusting mechanism. By placing the leading end of the portable telephone 10 inside the holding recess 8, the portable telephone 10 can be held stably.

When the keyboard input device is not used, as shown in FIG. 6, the second keyboard unit 2b is folded on the unit hinges 4 so that is placed onto the first keyboard unit 2, and the cover member 3 is then folded on the cover hinge 5 so that it is placed onto the second keyboard unit 2b. This substantially reduces the width of the keyboard input device.

While the single cover member 3 is used in the above first embodiment, two or more cover members may be used. While the keyboard body 2 is partly covered with the cover member 3 in the above first embodiment, the entire surface of the keyboard body 2 may be covered with the cover member.

Figure 7:
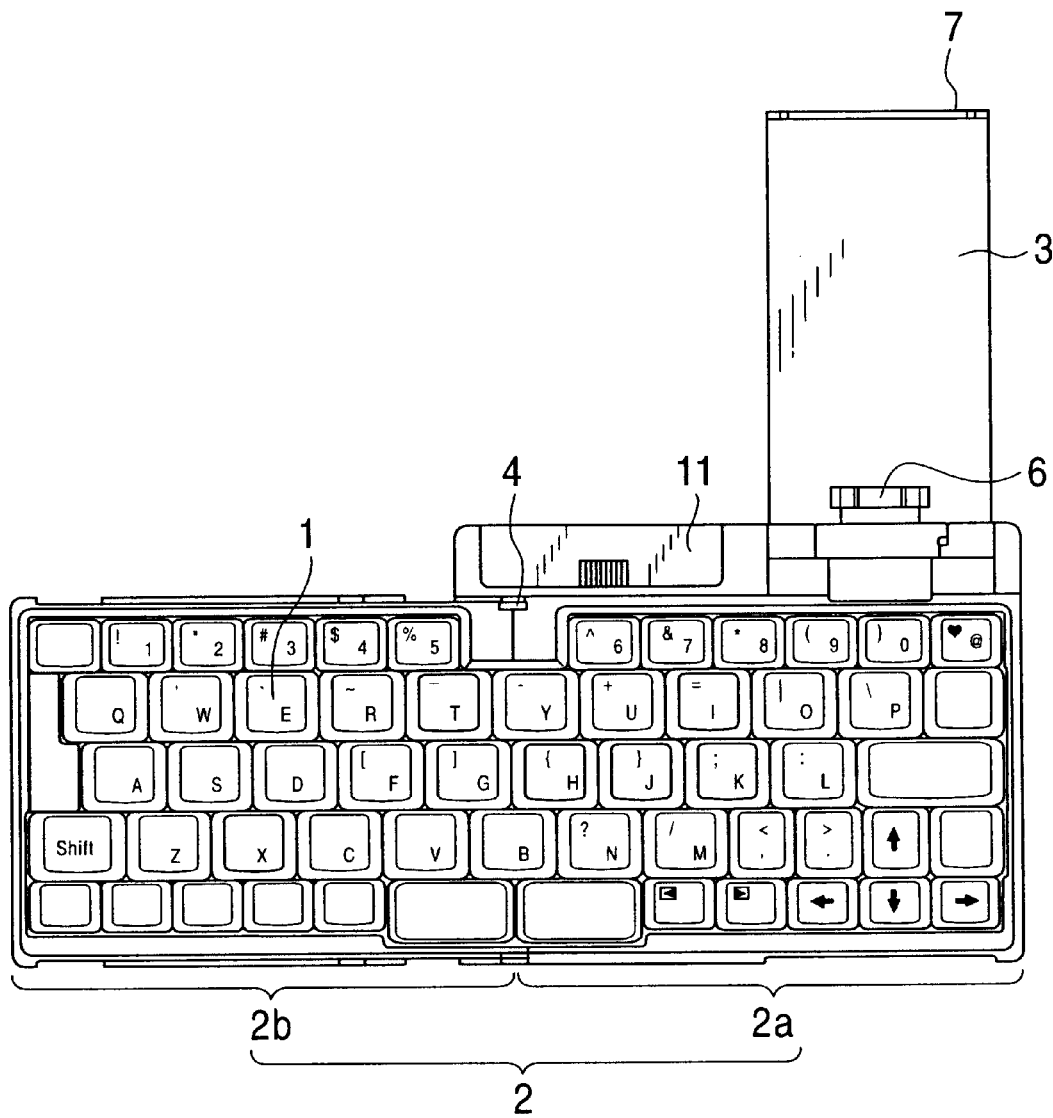
FIG. 7 is a plan view of a keyboard input device according to a second embodiment of the present invention.
Figure 8:
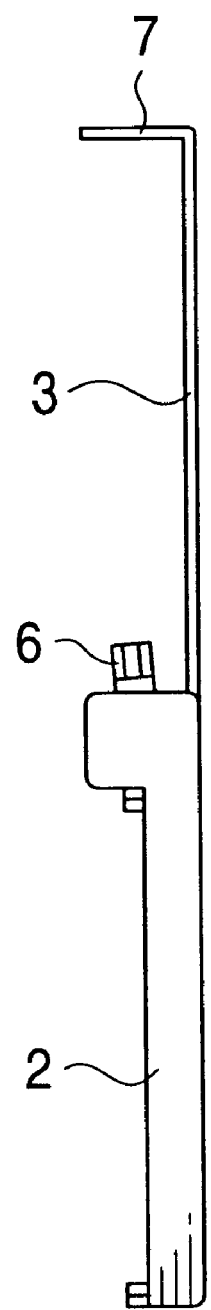
FIG. 8 is a side view of the keyboard input device.
Figure 9:
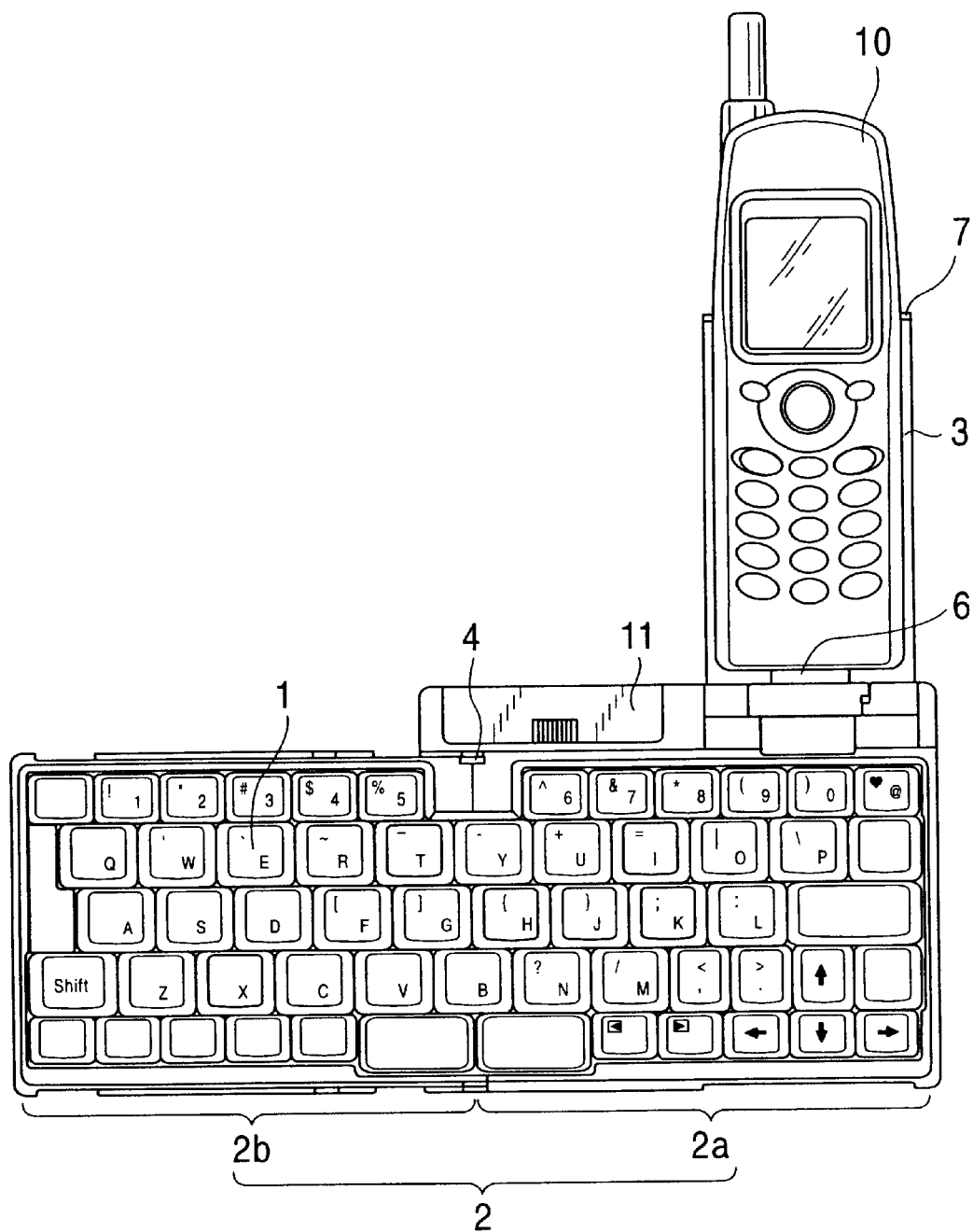
FIG. 9 is a plan view of the keyboard input device to which a portable telephone is attached.
Figure 10:
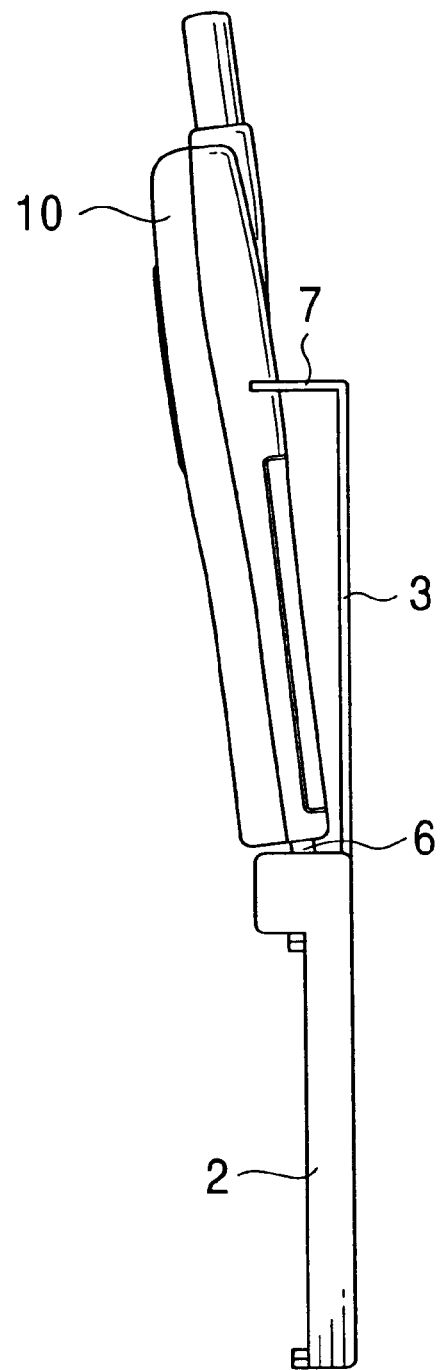
FIG. 10 is a side view of the keyboard input device to which the portable telephone is attached.
Figure 11:
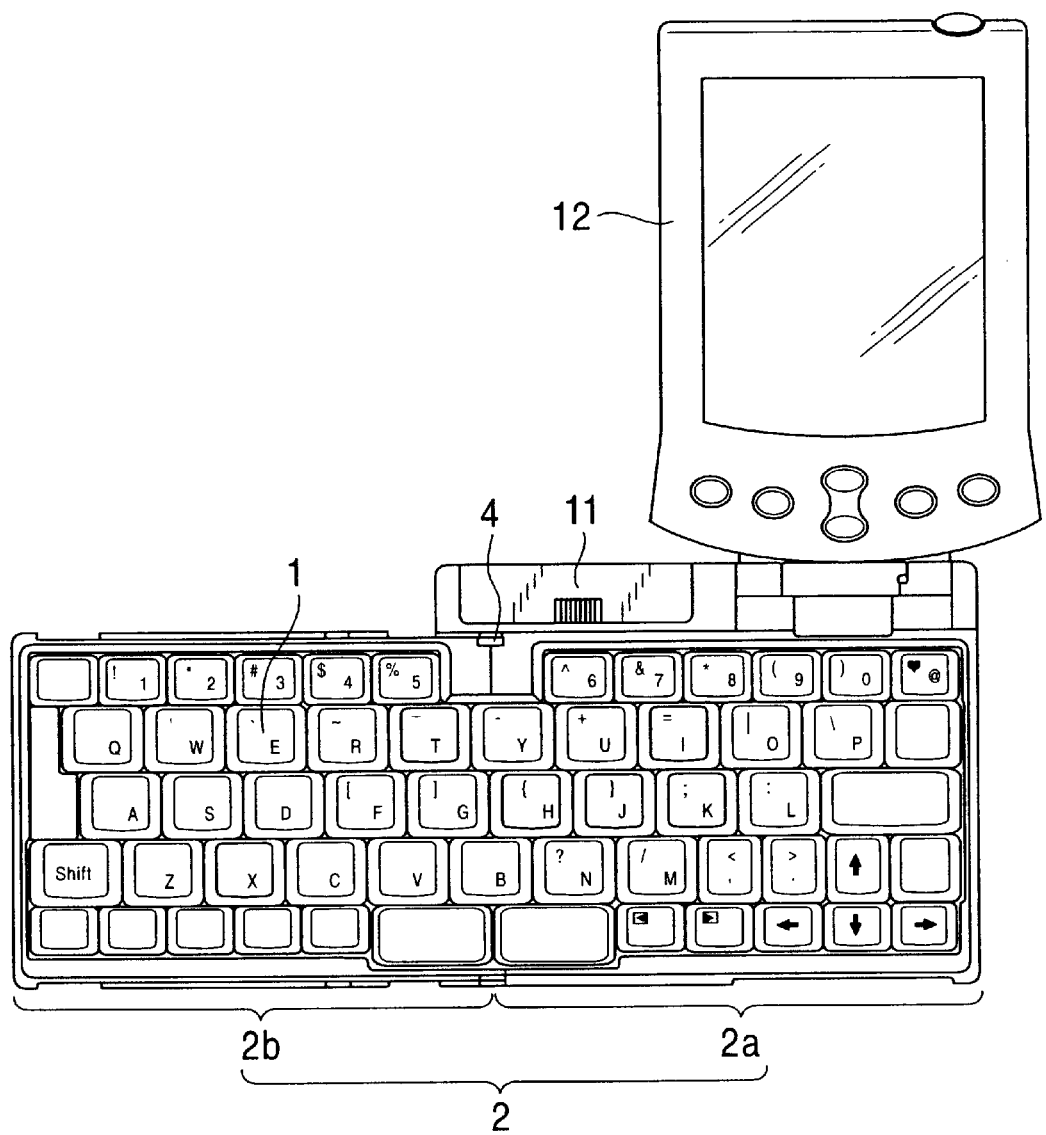
FIG. 11 is a plan view of the keyboard input device to which a personal digital assistant is attached.
Figure 12:
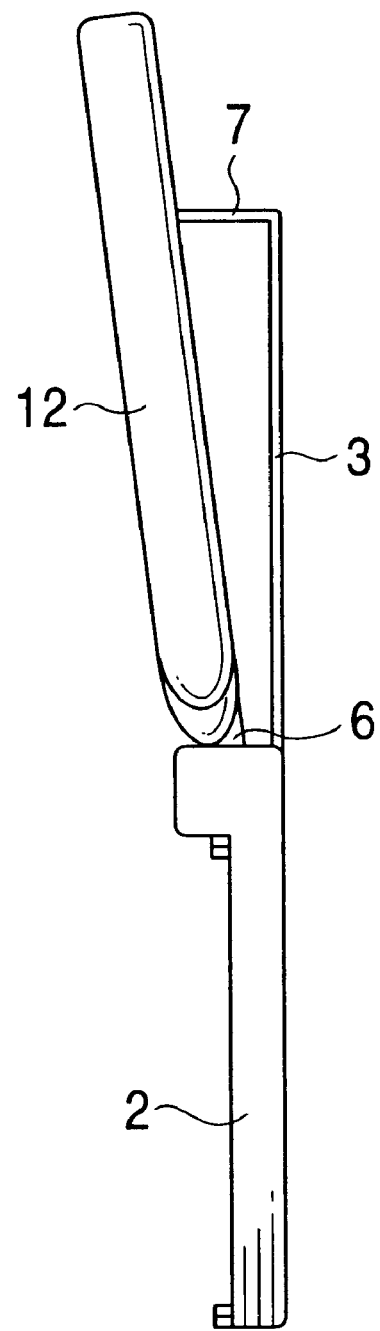
FIG. 12 is a side view of the keyboard input device to which the personal digital assistant is attached.

FIGS. 7 to 12 show a keyboard input device according to a second embodiment of the present invention. FIG. 7 is a plan view of the keyboard input device of the second embodiment, FIG. 8 is a side view of the keyboard input device, FIGS. 9 and 10 are a plan view and a side view, respectively, of the keyboard input device to which a portable telephone is attached and FIGS. 11 and 12 are a plan view and a side view, respectively, of the keyboard input device to which a personal digital assistant is attached.

Referring to these figures, reference numerals 11 and 12 respectively denote a storage portion containing a control circuit board and a battery (power source), and a personal digital assistant (PDA) having a wireless communication system. As shown in FIGS. 10 and 12, a portable telephone 10 or the PDA 12 to be used is placed in a tilted position on a cover member 3, and is connected to a keyboard body 2 via a connector 6.

Figure 13:
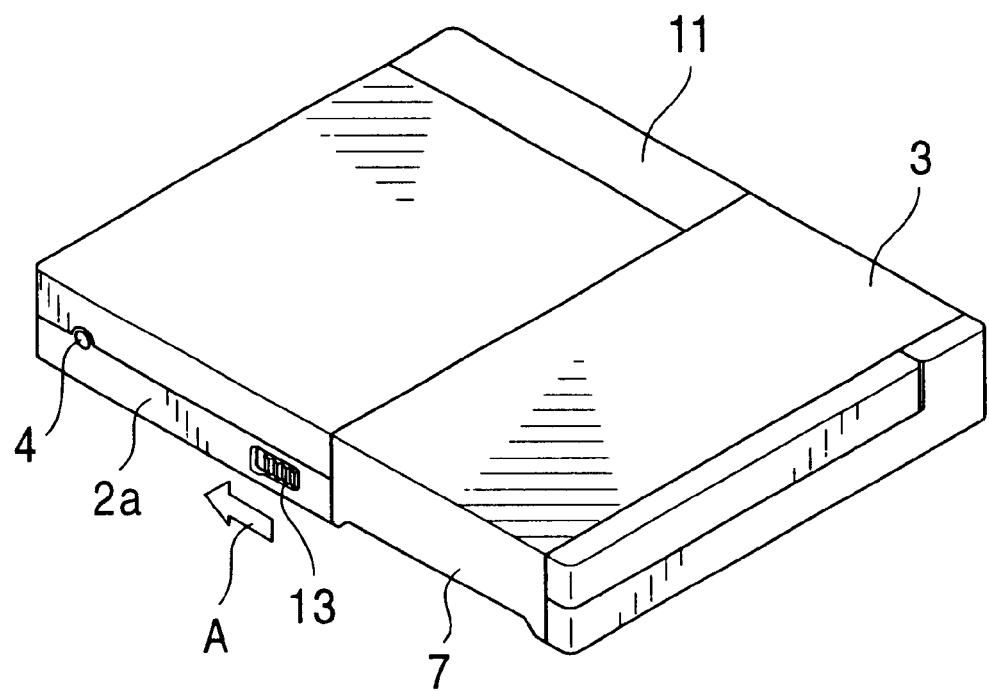
FIG. 13 is a perspective view showing a non-operation state of a keyboard input device according to a third embodiment of the present invention.
Figure 14:
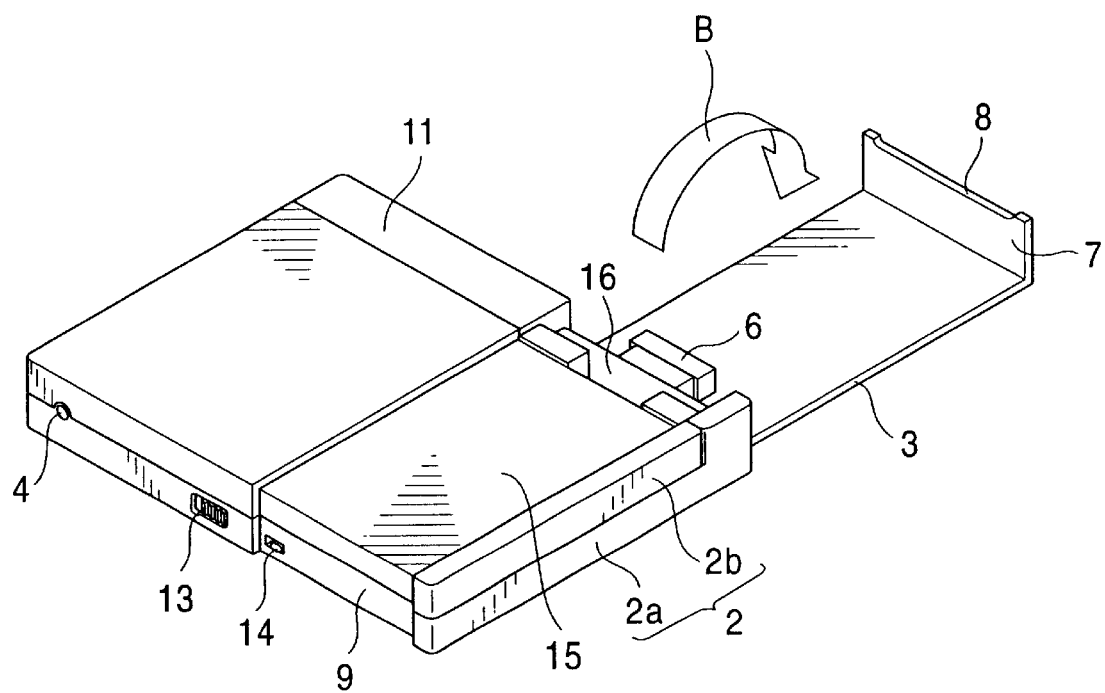
FIG. 14 is a perspective view showing a state in which a cover member of the keyboard input device is pivoted.
Figure 15:
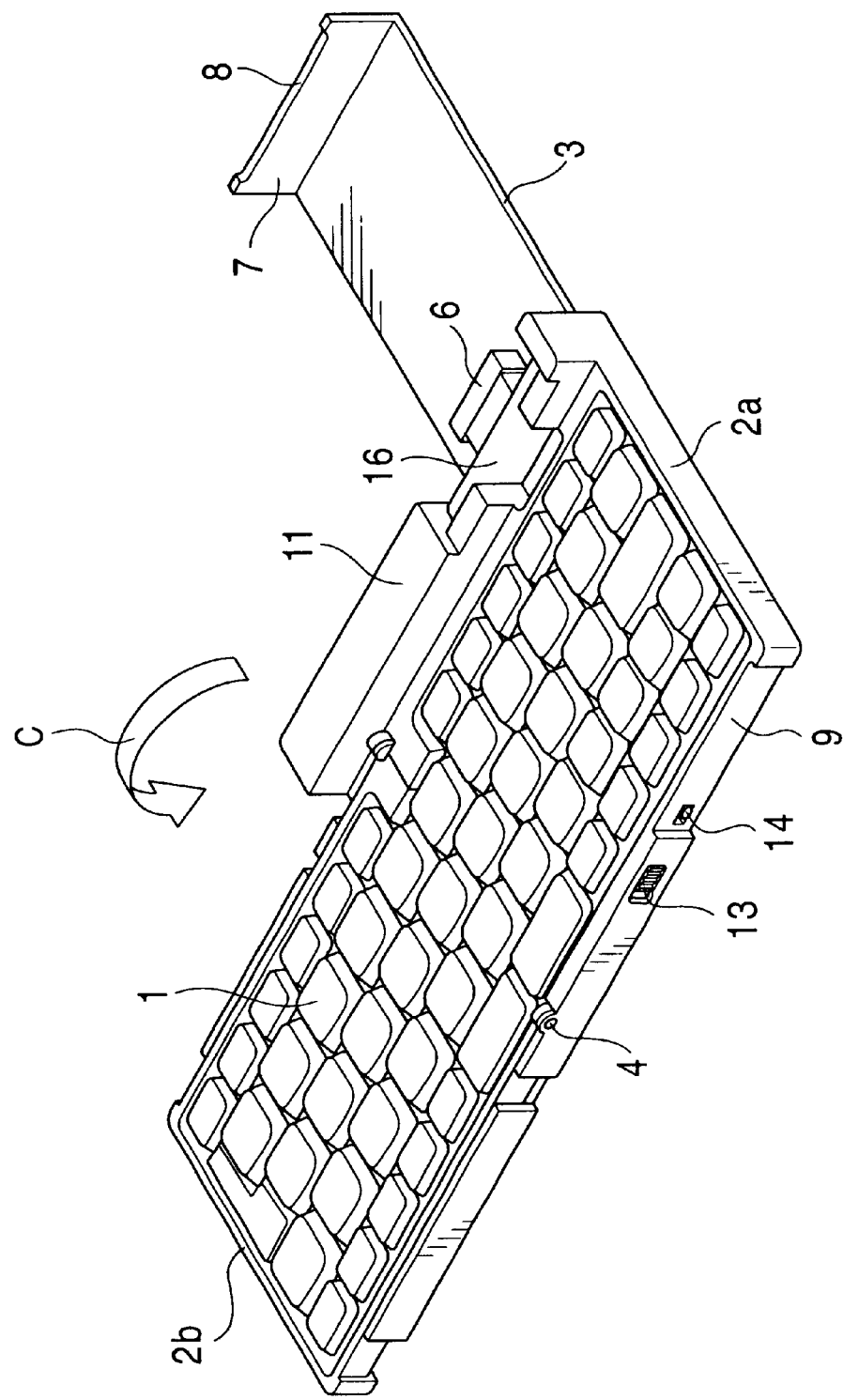
FIG. 15 is a perspective view showing a state in which a second keyboard unit of the keyboard input device is pivoted.

FIGS. 13 to 15 show a keyboard input device according to a third embodiment of the present invention. In these figures, reference numerals 13, 14, 15, and 16 respectively denote an unlock button, a lock portion, a cover member accommodating portion for accommodating a cover member 3, and a connector accommodating portion for accommodating the head of a connector 6.

FIG. 13 shows the keyboard input device in a non-operation state. In this state, a second keyboard unit 2b is folded on unit hinges 4 so that it is placed onto a first keyboard unit 2a, and a cover member 3 is folded on a cover hinge (not shown) so that it is placed onto the second keyboard unit 2b. Since the keyboard input device can thus be folded, the width thereof is reduced (to almost half the width in an operation state), and this is convenient for carrying and storage.

In this state, the lock portion 14 is engaged with a supporting projection 7 of the cover member 3, and the cover member 3 is maintained in a locked state so that it will not inadvertently open. The cover member 3 is accommodated in the cover member accommodating portion 15, the supporting projection 7 of the cover member 3 is accommodated in the supporting projection accommodating portion 9, and the head of the connector 6 is accommodated in the connector accommodating portion 16. Therefore, the keyboard input device have flat outer faces having no projections, and the outer shape thereof is simplified.

When the keyboard input device is used, the cover member 3 is unlocked and is allowed to pivot by sliding the unlock button 13 in the direction of A in FIG. 13. When the cover member 3 is opened approximately 180° in the direction of arrow B in FIG. 14, a stopper (not shown) works to prevent the cover member 3 from being opened further. The connector 6 pivots with the pivotal movement of the cover member 3. As described above, the connector 6 can pivot with some degrees of freedom.

When the second keyboard unit 2b is opened approximately 180° in the direction of arrow C in FIG. 15, the key surfaces of the first keyboard unit 2a and the second keyboard unit 2b are aligned with each other, and the first keyboard unit 2a and the second keyboard unit 2b are lightly locked and are maintained in a horizontal position in this state. As a result, key operation can be performed on the keys or the like.

Figure 16:
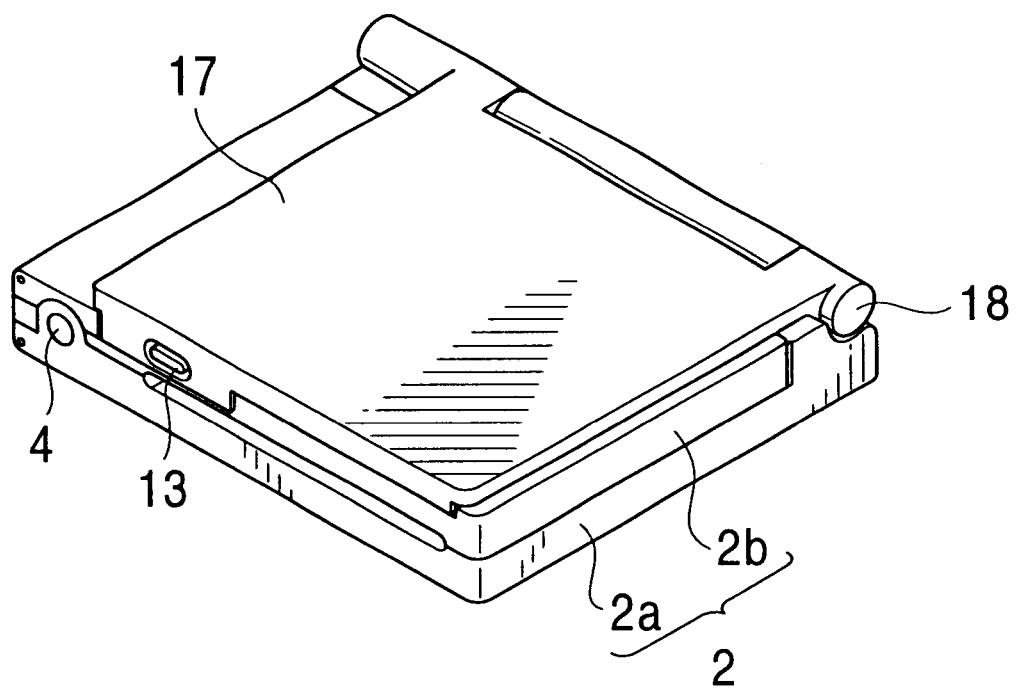
FIG. 16 is a perspective view showing a non-operation state of a keyboard input device according to a fourth embodiment of the present invention.
Figure 17:
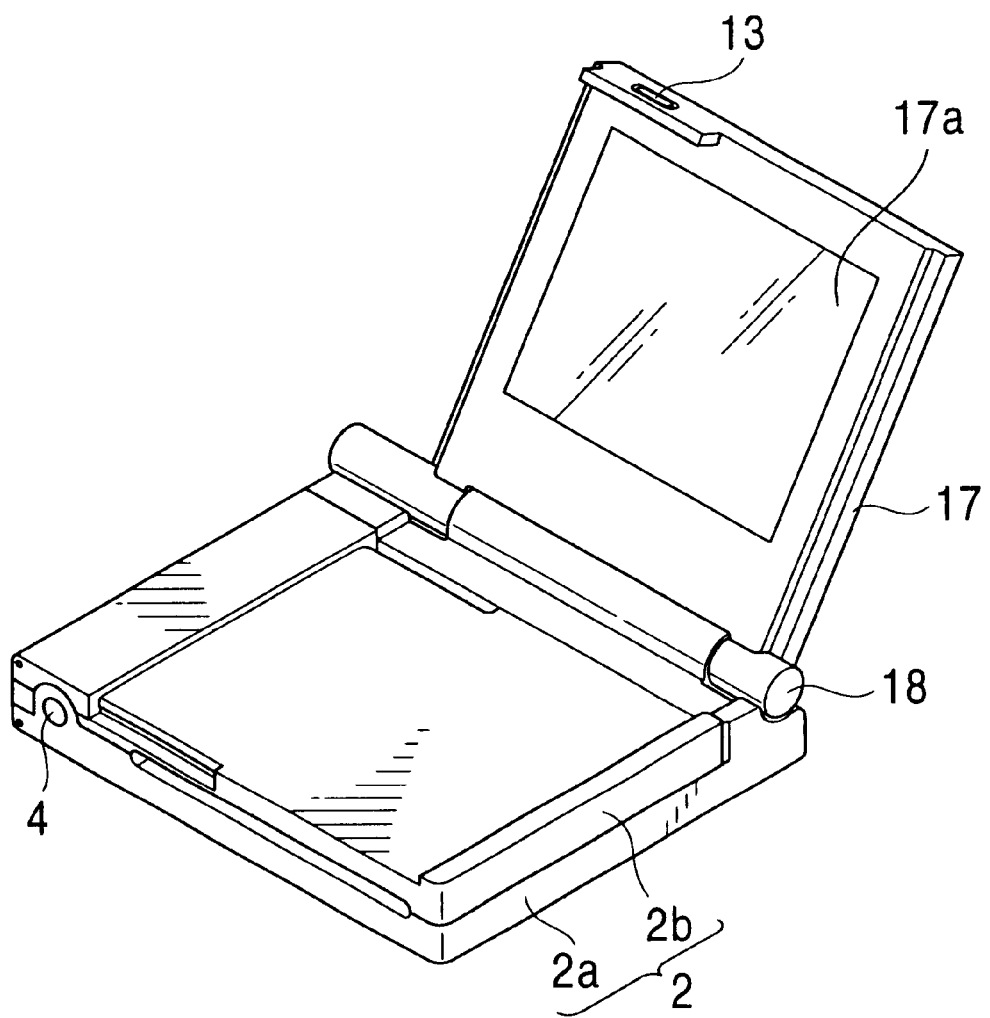
FIG. 17 is a perspective view showing a state in which a display portion of the keyboard input device is pivoted.
Figure 18:
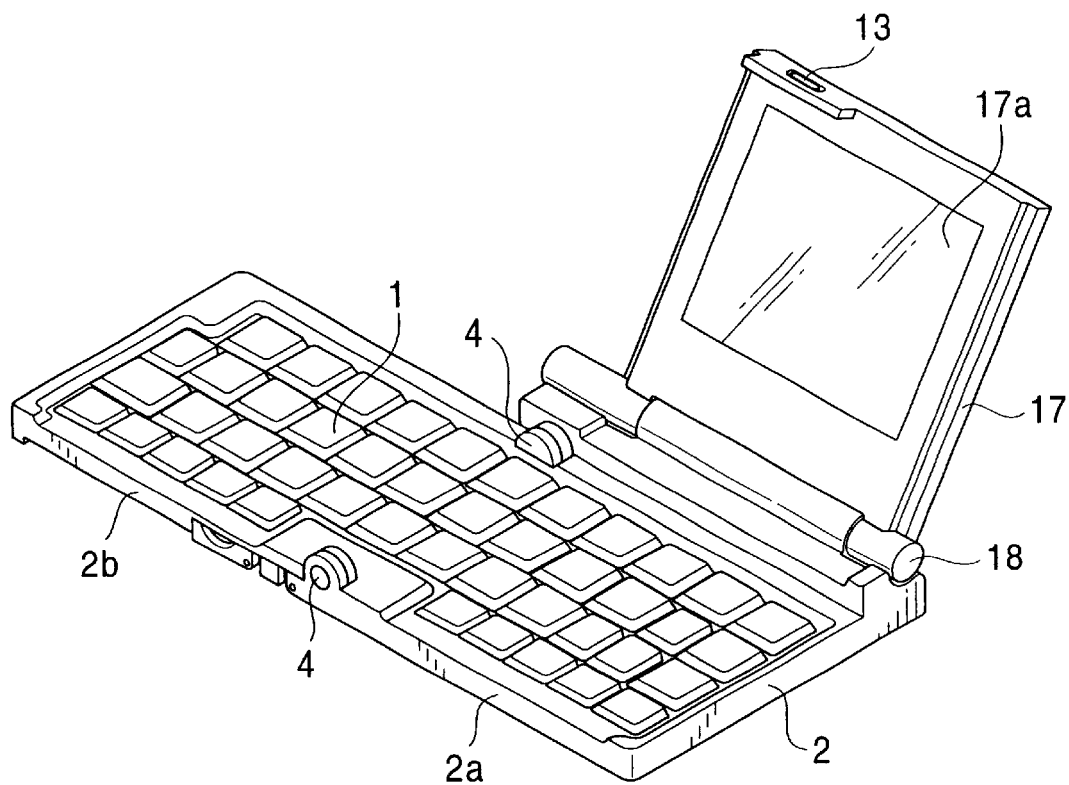
FIG. 18 is a perspective view showing a state in which a second keyboard unit of the keyboard input device is pivoted.

FIGS. 16 to 18 show a key input device according to a fourth embodiment of the present invention. In these figures, a flat display portion 17 is formed of, for example, a liquid crystal panel, and a display hinge 18 pivotally supports the display portion 17 on a keyboard body 2.

FIG. 16 shows the keyboard input device in a non-operation state. In this state, a second keyboard unit 2b is folded on unit hinges 4 so that it is placed onto a first keyboard unit 2a, and the display portion 17 is folded on the display hinge 18 so that it is placed onto the second keyboard unit 2b. A display screen 17a of the display portion 17 is protected by the second keyboard unit 2b, and the display portion 17 is prevented by a lock mechanism (unlock button 13 of the lock mechanism is shown) from being inadvertently opened.

When using the keyboard input device, the display portion 17 is unlocked by pressing an unlock button 13 disposed on the display portion 17, and is raised so that it is slightly inclined with respect to the keyboard body 2, as shown in FIG. 17. Subsequently, when the second keyboard unit 2b is opened approximately 180°, the key surfaces of the first keyboard unit 2a and the second keyboard unit 2b are aligned, and are lightly locked in this state.

Figure 19:
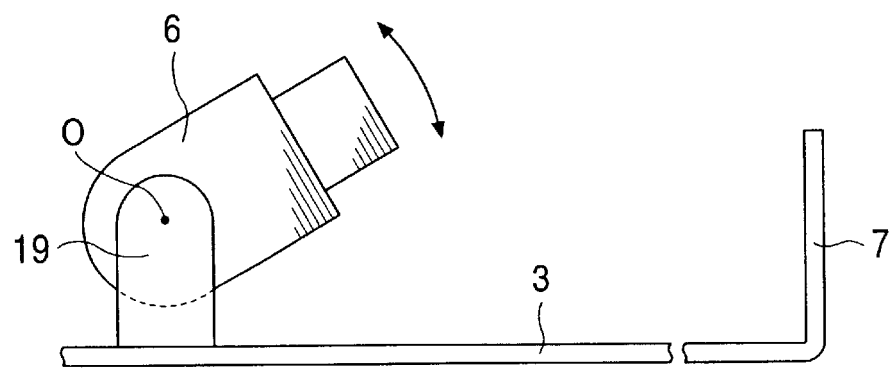
FIG. 19 is a side view showing the principal part adjacent to a connector in a keyboard input device according to a fifth embodiment of the present invention.

FIG. 19 is a side view showing the principal part adjacent to a connector in a keyboard input device according to a fifth embodiment of the present invention. As shown in FIG. 19, a connector 6 is supported by a connector supporting portion 19 of a keyboard body 2 so that it can ago pivot on a point O. As described above, a portable device, such as a portable telephone 10 or a PDA 12, is placed on a supporting projection 7 of a cover member 3, and a connector portion incorporated in the portable device is inserted in and connected to the connector 6. In most cases, the position of the connector portion of the portable device varies among manufacturers or among models.

For this reason, if the connector 6 is fixed to the cover member 3, the positional relationship between the connector 6 and the supporting projection 7 is determined, and the connector portion of the portable device will not be reliably inserted in the connector 6 when the position of the connector portion varies, as described above. Since the connector 6 is pivotally supported in this embodiment, as described above, it is possible to respond to such variations in position of the connector portions of the portable devices, and to consistently establish a reliable connection with the portable device.

Figure 20:
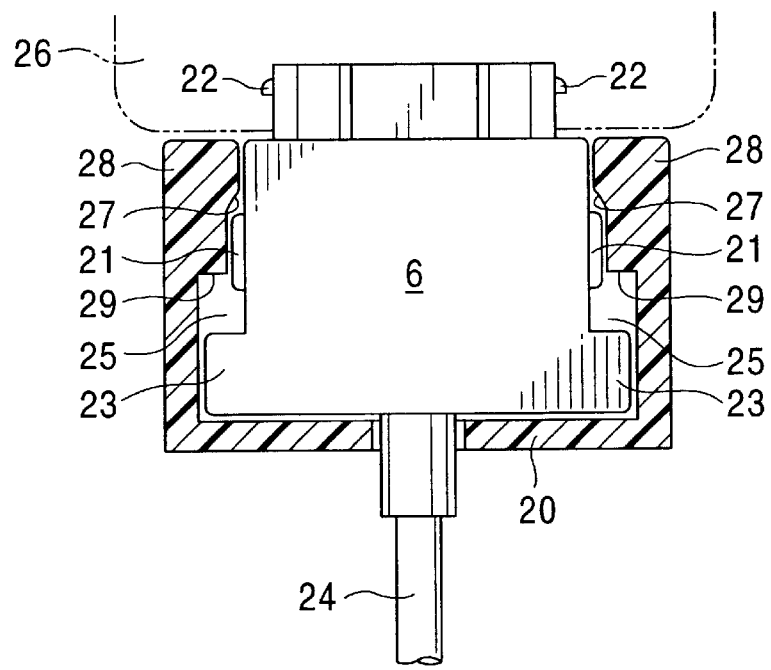
FIG. 20 is an explanatory view showing a state of a keyboard input device according to a sixth embodiment of the present invention, in which a connector portion of a portable device is inserted in a connector.
Figure 21:
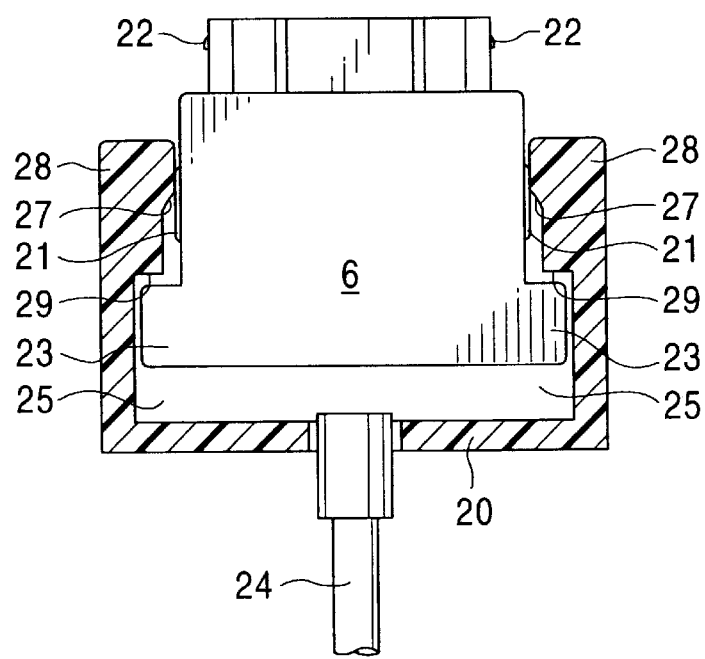
FIG. 21 is an explanatory view showing a state in which the portable device (connector portion) is drawn out of the connector of the keyboard input device.

FIGS. 20 and 21 are partly sectional side views of a connector and its surroundings in a sixth embodiment of the present invention. FIG. 20 shows a state in which a connector portion of a portable device is inserted in the connector, and FIG. 21 shows a state in which the portable device (connector portion) is drawn out of the connector.

As shown in these figures, a connector 6 is held in a connector holding member 20 so that it can move slightly. Elastically retractable pushbuttons 21 are formed at the midpoints of both side faces of the connector 6, and are operationally connected to retaining claws 22 formed at the leading end of the connector 6. Fall-preventive projections 23 are formed at the lower ends of both side faces of the connector 6, and a cable 24 is connected to the bottom end of the connector 6.

A storage space 25 for accommodating the connector 6 is formed inside the connector holding member 20. The storage space 25 is somewhat larger than the connector 6 in the inserting and drawing direction of a portable device 26 such as a portable telephone or a PDA. Projecting portions 28 each having an inclined surface 27 are formed on both sides of the connector holding member 20 adjacent to an upper opening, and stepped stoppers 29 are formed below the projecting portions 28.

When the portable device 26 (connector portion) is inserted into the connector 6, the retaining claws 22 of the connector 6 engage with engaging portions (not shown) of the connector portion incorporated in the portable device 26, thereby preventing the portable device 26 from being inadvertently drawn out of the connector 6 while being attached to the keyboard input device. During such use, as shown in FIG. 20, the connector 6 is pressed against the bottom side of the connector holding member 20 by the insertion of the portable device 26, and the pushbuttons 21 protrude outside without contact with the projecting portions 28. Consequently, the retaining claws 22 also protrude while maintaining the engagement with the engaging portions.

When the portable device 26 is drawn out of the keyboard input device, since the retaining claws 22 and the engaging portions of the connector portion are engaged with each other in the initial state, the connector 6 is moved in the drawing direction, and the pushbuttons 21 pass over the projections portions 28 through the inclined surfaces 27 and are pressed by the projecting portions 28 toward the center of the connector 6. In response to the press of the pushbuttons 21, the retaining claws 22 are also moved toward the center of the connector 6 and are disengaged from the portable device 26, so that the portable device 26 is allowed to be pulled out. Since the movement of the connector 6 inside the connector holding member 20 is stopped when the fall-preventive projections 23 abut the stoppers 29, the connector 6 will not fall out of the connector holding portion 20.

Figure 22:
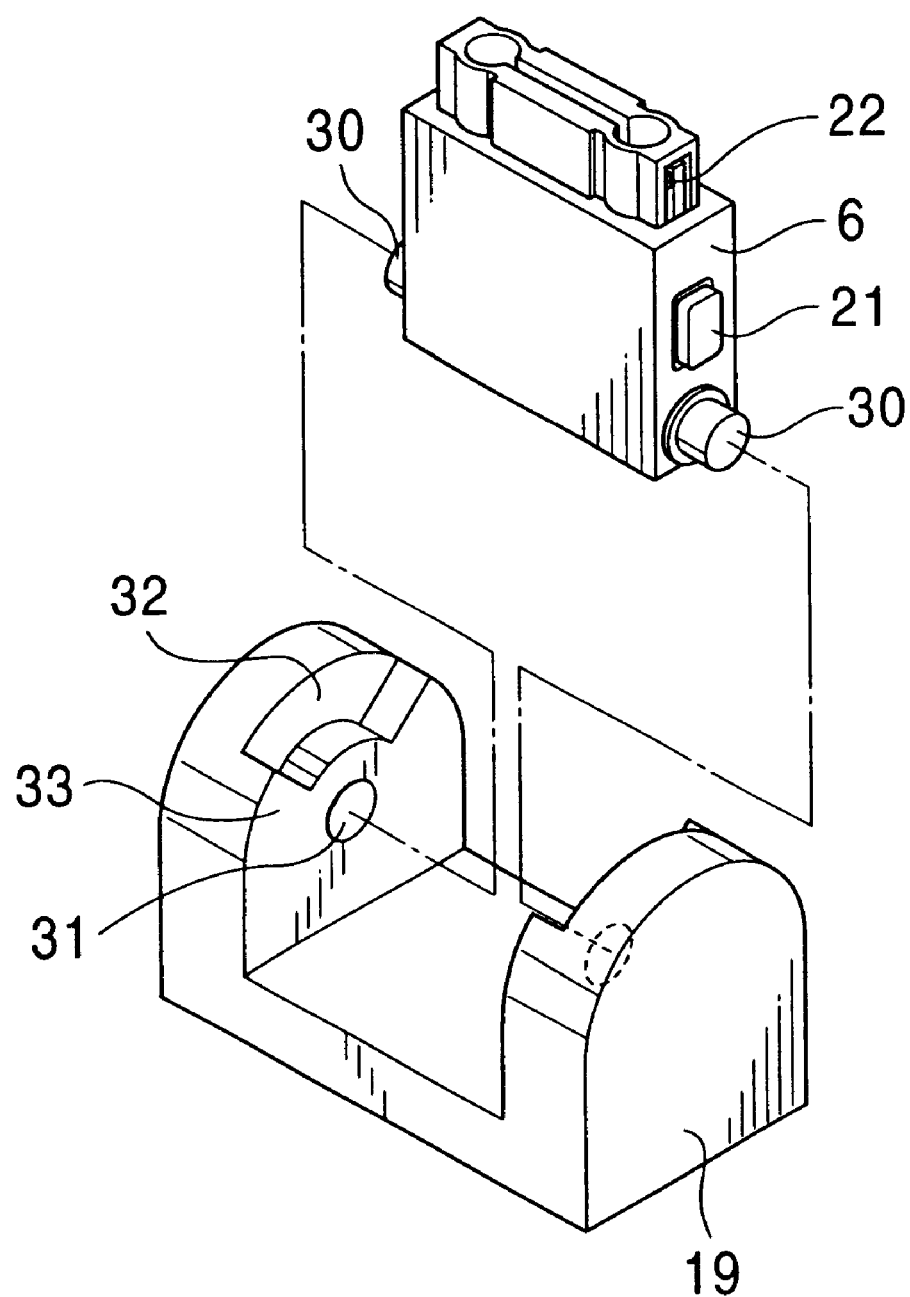
FIG. 22 is a perspective view showing a state before a connector is mounted in a connector supporting portion in a keyboard input device according to a seventh embodiment of the present invention.
Figure 23:
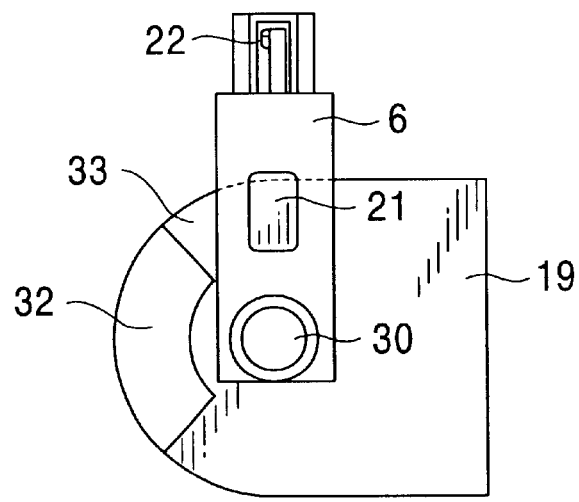
FIG. 23 is a side view of the connector placed in an upright position.
Figure 24:
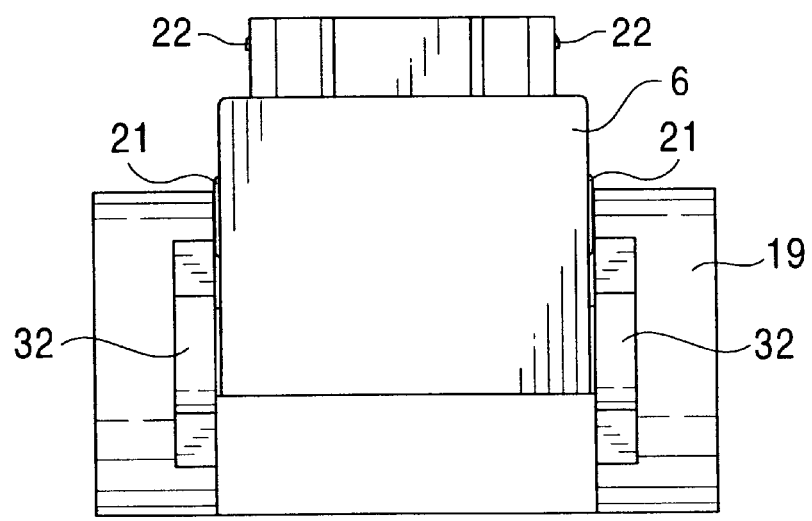
FIG. 24 is a front view of the connector in the state shown in FIG. 23.
Figure 25:
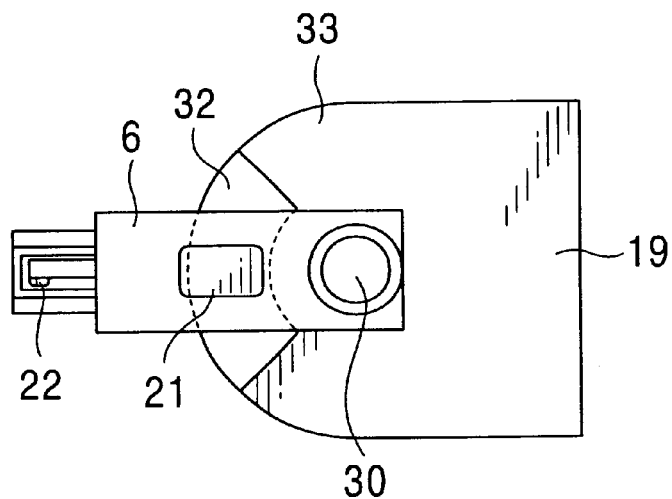
FIG. 25 is a side view of the connector placed in a tilted position.
Figure 26:
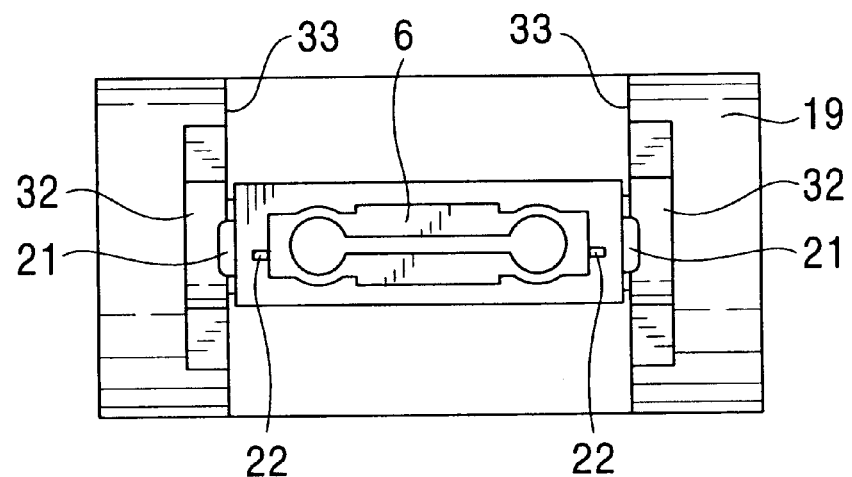
FIG. 26 is a front view of the connector in the state shown in FIG. 25.
Figure 27:
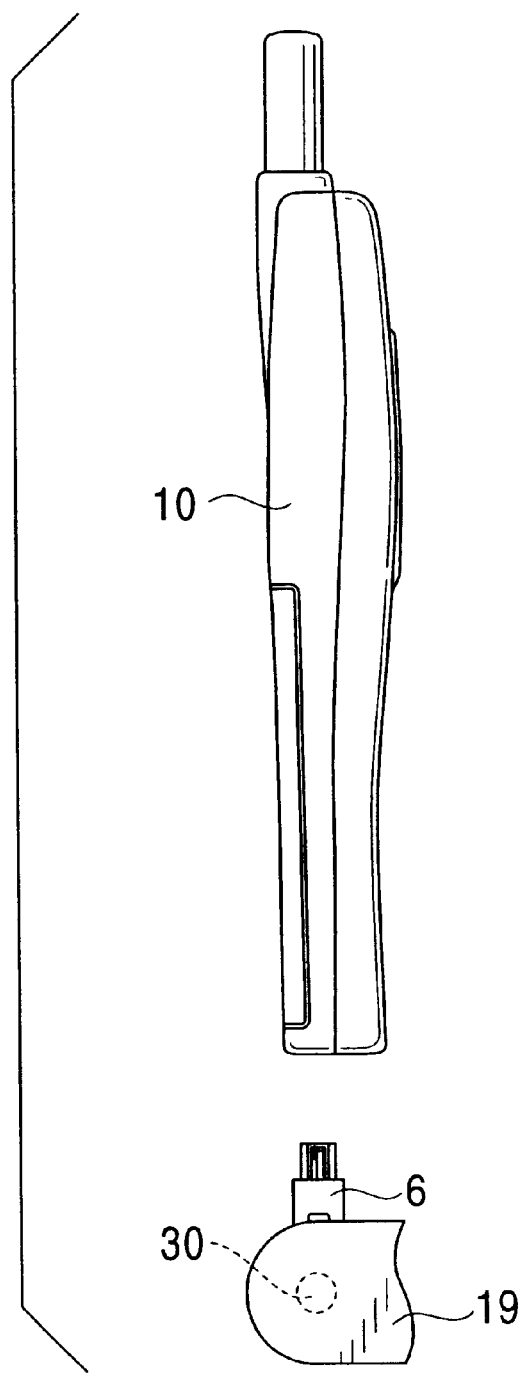
FIG. 27 is a side view showing a state immediately before a portable telephone is inserted in the connector.
Figure 28:
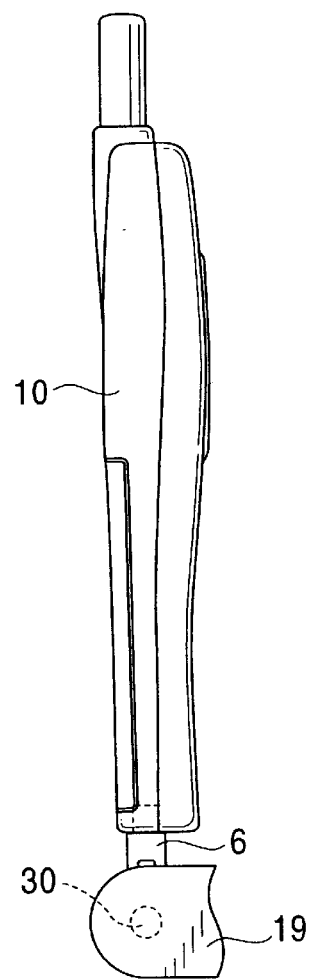
FIG. 28 is a side view showing a state immediately after the portable telephone is inserted in the connector.
Figure 29:
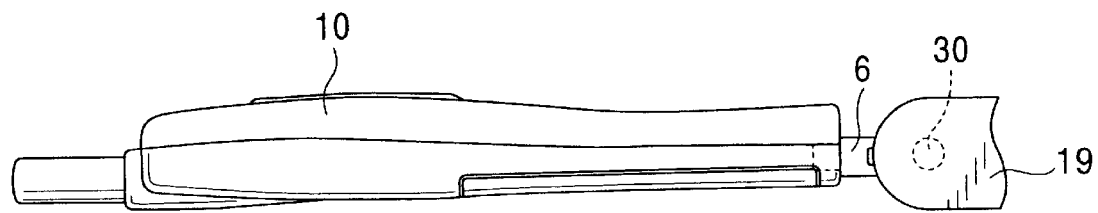
FIG. 29 is a side view showing a state in which the portable telephone and the connector are placed in a tilted position.

FIGS. 22 to 29 show a seventh embodiment of the present invention. FIG. 22 is a perspective view showing a state before a connector is mounted in a connector supporting portion. It should be noted that in FIG. 22 the connector support portion 19 is shown, for the purpose of clarity, rotated 90° from its normal operative position shown in FIGS. 23–29. FIG. 23 is a side view showing a state in which the connector is placed in an upright position, FIG. 24 is a front view showing the state shown in FIG. 23, FIG. 25 is a side view showing a state in which the connector is placed in a horizontal position, FIG. 26 is a front view showing the state shown in FIG. 25, FIG. 27 is a side view showing a state immediately before a portable telephone is inserted in the connector, FIG. 28 is a side view showing a state immediately after the portable telephone is inserted in the connector, and FIG. 29 is a side view of the portable telephone and the connector which are placed in the horizontal position.

As shown in FIG. 22, support shafts 30 are formed on both side faces of a connector 6, and are inserted in shaft holes 31 formed on inner walls 33 of a connector supporting portion 19. Fan-shaped recesses 32 centered on the shaft holes 31 are formed above the shaft holes 31. Retractable pushbuttons 21 are formed above the support shafts 30 of the connector 6 so as to move in response to the movement of retaining claws 22 disposed in a head portion of the connector 6.

During a standby mode before a portable telephone 10 is attached, as shown in FIGS. 23, 24, and 27, the connector 6 is placed substantially perpendicularly to the connector supporting portion 19. In this case, the pushbuttons 21 are elastically pressed by the inner walls 33 of the connector supporting portion 19, and with this, the retaining claws 22 hardly protrude from the side faces of the head portion of the connector 6 (see FIG. 24). In this state, a connector portion of the portable telephone 10 is inserted in the connector 6 (see FIG. 28).

When the insertion is completed, the connector 6 and the telephone 10 are tilted down (see FIG. 29), and the pushbuttons 21 are thereby fitted in the fan-shaped recesses 32 (FIGS. 25 and 26). As a result, the pushbuttons 21 no longer press against the inner walls 33 and protrude from the side faces of the connector 6. The retaining claws 22 also protrude from the side faces of the head portion of the connector 6 and engage with the connector portion of the portable telephone 10, thus preventing the portable telephone 10 from inadvertently falling off the connector 6.

In order to draw the portable telephone 10 out of the connector 6, the connector 6 is raised together with the portable telephone 10. By doing so, the pushbuttons 21 are put into elastic contact with the inner walls 33 of the connector supporting portion 19, as shown in FIGS. 23 and 24, and the retaining claws 22 retract into the connector 6 and disengage from the portable telephone 10. Consequently, the portable telephone 10 can be drawn out of the connector 6 (see FIG. 27).

Figure 30:
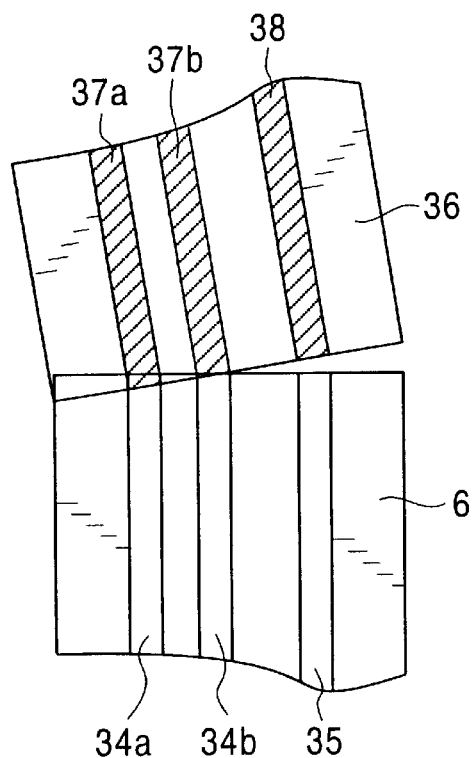
FIG. 30, which has been labeled PRIOR ART, is a general plan view of a conventional connector and connector portion, illustrating a problem that exist in the prior art.
Figure 31:
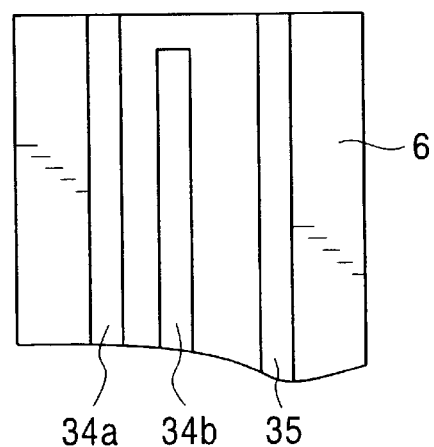
FIG. 31 is a general plan view of a connector serving as a first solution to the problem.
Figure 32:
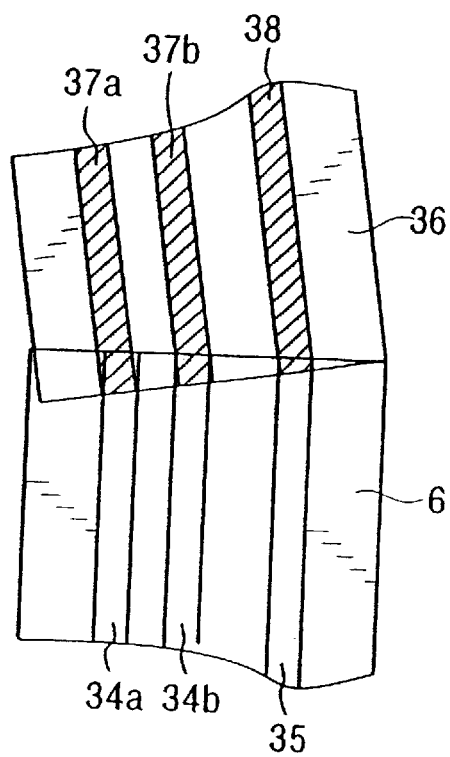
FIG. 32 is a general plan view showing a state in which a connector portion of a portable device is inserted in the connector.
Figure 33:
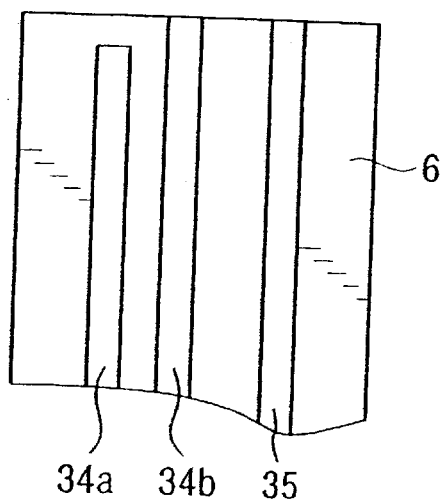
FIG. 33 is a general plan view of a connector serving as a second solution to the problem.
Figure 34:
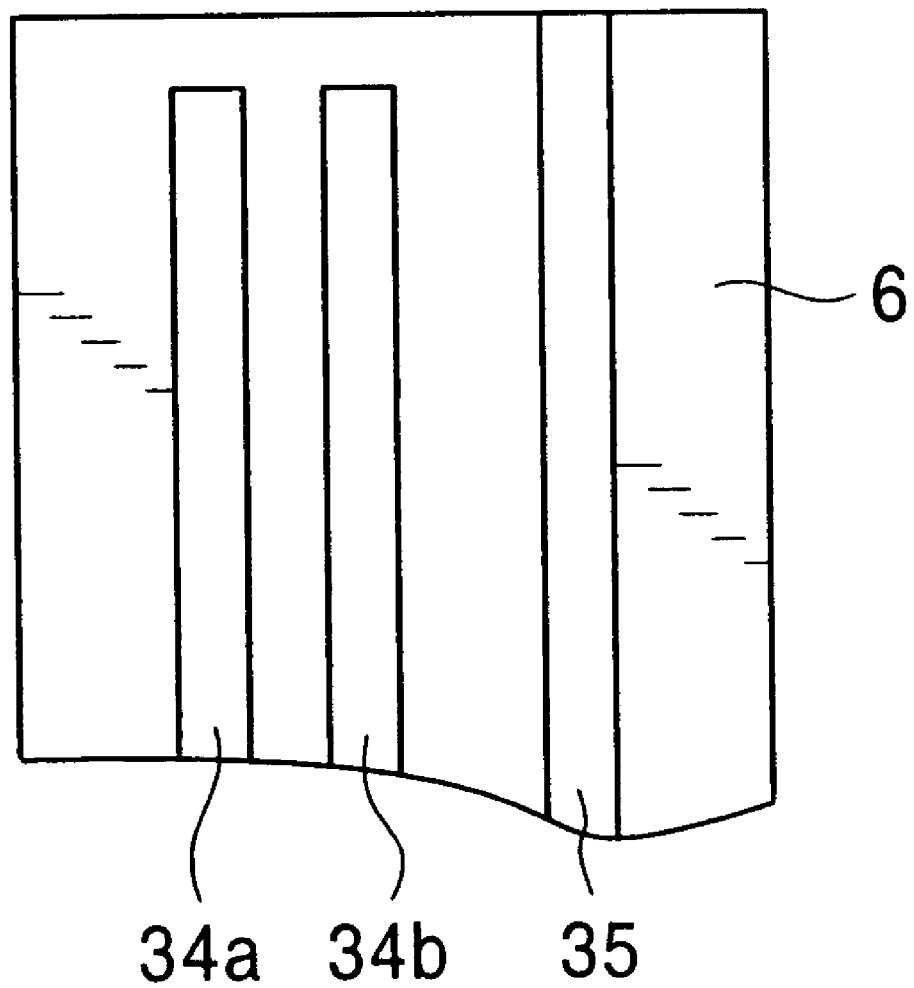
FIG. 34 is a general plan view of a connector serving as a third solution to the problem.

FIGS. 30 to 34 show an eighth embodiment of the present invention. FIG. 30 is a general plan view illustrating a problem of a conventional connector. FIG. 31 is a general plan view of a connector serving as a first solution to the problem illustrated in FIG. 30. FIG. 32 is a general plan view showing a state in which a connector portion of a portable device is inserted in the connector. FIG. 33 is a general plan view of a connector serving as a second solution to the problem illustrated in FIG. 30, and FIG. 34 is a general plan view of a connector serving as a third solution to this problem.

As shown in FIG. 30, a connector 6 has two ground pins 34a and 34b and a required number of data pins 35 (only one data pin 35 is shown for plain illustration). A connector portion 36 of a portable device also has two ground pins 37a and 37b and a required number of data pins 38. When it is detected that the two ground pins 34a and 34b of the connector 6 and the two ground pins 37a and 37b of the connector portion 36 of the portable device have been connected to each other, a keyboard body is powered on.

In a case in which the ground pins 34a and 34b of the connector 6 have the same length as that of the data pin 35 and extend to the leading end of the connector 6, when the connector portion 36 is obliquely inserted in the connector 6, the ground pins 34a and 34b are connected to the ground pins 37a and 37b, whereas the data pin 35 may not be connected to the data pin 38. In this case, the keyboard body is powered on, but data input and output are impossible.

A first solution to this problem is to set the length of one of the ground pins 34b less than those of the other ground pin 34a and the data pin 35, as shown in FIG. 31. In this case, when the short ground pin 34b is connected to the ground pin 37b of the connector portion 36, the other pins are inevitably connected. This can overcome the problem that data input and output are impossible though the keyboard body is powered on.

A second solution is to set the length of one of the ground pins 34a to be slightly less than those of the other ground pin 34b and the data pin 35, as shown in FIG. 33. A third solution is to set the lengths of the two ground pins 34a and 34b to be slightly less than that of the data pin 35, as shown in FIG. 34. The second and third solutions can also overcome the problem that data input and output are impossible though the keyboard body is powered on.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A keyboard input device comprising:
   a folding keyboard body divided into at least first and second sections;
   a device mounting member pivotally supported by said keyboard body to mount a portable device thereon; and
   a connector disposed on a pivot side of said device mounting member, said connector being pivotably supported to connect said keyboard body and said portable device;
   wherein a width of said device mounting member is smaller than a width of one side of the keyboard body in a folded state, and said device mounting member is folded onto said keyboard body in the folded state and
   wherein said connector has a retaining portion that is adapted to be engaged with and disengaged from a part of said portable device, and engagement of said retaining portion with and disengagement of said retaining portion from said portable device are switched by movement of said connector.

2. A keyboard input device according to claim 1, wherein said device mounting member can accommodate the portable device to be placed in a tilted position.

3. A keyboard input device according to claim 2, wherein a tilting angle of said portable device is arbitrarily adjustable.

4. A keyboard input device according to claim 1, wherein said device mounting member is made of a plate.

5. A keyboard input device according to claim 1, wherein said device mounting member has a holding recess for holding said portable device.

6. A keyboard input device according to claim 1, wherein said device mounting member also functions as a cover member for covering at least a part of said keyboard body.

7. A keyboard input device according to claim 1, further comprising a display portion supported by said keyboard body so that the display portion can be folded onto said folded keyboard body.

8. A keyboard input device according to claim 1, wherein said connector establishes a connection with a connector portion of said portable device, each of said connector of said keyboard body and said connector portion of said portable device having two ground pins and a predetermined number of data pins, said two ground pins of said connector and said two ground pins of said connector portion are connected to each other so as to power said keyboard body on, and at least one of said ground pins of said connector is shorter than the other pins.

9. A keyboard input device according to claim 1, wherein the first section of the keyboard body has a lock portion for locking the device mounting member into a closed state so that the second section of the keyboard body lies between the first section and the device mounting member.

* * * * *